(12) United States Patent
Wei et al.

(10) Patent No.: US 7,677,783 B2
(45) Date of Patent: Mar. 16, 2010

(54) BACKLIGHT MODULE WITH POINT LIGHT SOURCE HAVING LIGHT GUIDE PORTION

(75) Inventors: Ying Wei, Shenzhen (CN); Chih-Hung Chang, Miao-li (TW)

(73) Assignees: Innocom Technology (Shenzhen) Co., Ltd., Shenzhen, Guangdong Province (CN); Innolux Display Corp., Miao-Li County (TW)

( * ) Notice: Subject to any disclaimer, the term of this patent is extended or adjusted under 35 U.S.C. 154(b) by 45 days.

(21) Appl. No.: 11/983,018

(22) Filed: Nov. 5, 2007

(65) Prior Publication Data

US 2008/0106914 A1  May 8, 2008

(30) Foreign Application Priority Data

Nov. 3, 2006  (TW) .............................. 95140744 A

(51) Int. Cl.
*F21V 7/04* (2006.01)
(52) U.S. Cl. .................... 362/612; 362/610; 362/613
(58) Field of Classification Search .................. 362/27, 362/610, 611, 612, 613, 628, 800, 555
See application file for complete search history.

(56) References Cited

U.S. PATENT DOCUMENTS

| | | | | |
|---|---|---|---|---|
| 6,164,789 A | * | 12/2000 | Unger et al. | 362/610 |
| 6,881,980 B1 | | 4/2005 | Ting | |
| 7,157,853 B2 | * | 1/2007 | Imai et al. | 362/613 |
| 2007/0247872 A1 | * | 10/2007 | Lee et al. | 362/613 |
| 2007/0263408 A1 | * | 11/2007 | Chua | 362/612 |

* cited by examiner

*Primary Examiner*—Y My Quach Lee
(74) *Attorney, Agent, or Firm*—Wei Te Chung

(57) ABSTRACT

An exemplary point light source (20) includes a light emitting body (230), and a light guide portion (210) adjacent the light emitting body. The light emitting body includes an illuminating portion configured for providing light beams, and a shell packaging the illuminating portion. The light guide portion is configured for guiding the light beams to propagate in desired directions. A size of a cross-section of the light guide portion far away from the light emitting body is less than a size of a cross-section of the light guide portion adjacent to the light emitting body. A backlight module (200) using the point light source is also provided.

12 Claims, 2 Drawing Sheets

BACKLIGHT MODULE WITH POINT LIGHT SOURCE HAVING LIGHT GUIDE PORTION

FIELD OF THE INVENTION

The present invention relates to point light sources; and more particularly to a point light source having a light guide portion, and a backlight module using the point light source.

GENERAL BACKGROUND

Liquid crystal displays (LCDs) are widely used in various modern information products, such as notebooks, personal digital assistants, video cameras and the like. An LCD is a passive optical device. Thus a typical LCD needs a backlight module, which provides illumination to enable the LCD to display images.

A typical backlight module includes a light guide plate (LGP) and a plurality of point light sources. The point light sources may be light emitting diodes (LEDs). In certain modern products that use an LCD, the demand for portability of the product is great, and the LCD and its associated components such as the backlight module need to be very thin. Accordingly, the LGP needs to be as thin as possible. Ideally, each LED should be as thin as the LGP, so as to prevent light beams emitted by the LED from leaking. However, in present manufacturing processes this is difficult to achieve, due to limitations inherent in the packaging of an LED. A typical solution to this problem is to form a portion of the LGP adjacent to the LED as thick as the LED itself.

FIG. 6 is a schematic, side view of a conventional backlight module for an LCD. The backlight module 100 includes an LGP 12 and an LED 10. The LGP 12 includes a main body 123 and a light incident portion 120, which are inseparable portions of the one same piece. The main body 123 has a flat plate structure with a thickness less than that of the LED 10, and includes a top light emitting surface 122 and a bottom surface 124. The light incident portion 120 includes a light incident surface 121 adjacent to the LED 10. A thickness of the light incident portion 120 is the same as that of the LED 10, such that the LED 10 can fully abut the light incident surface 121 when the backlight module 100 is assembled. That is, all the light beams emitted by the LED 10 can be received by the LGP 12, and accordingly light beam leakage can be prevented.

When the backlight module 100 is employed in an LCD, a liquid crystal panel (not shown) is provided and disposed on top of the backlight module 100. In operation of the LCD, light beams provided by the LED 10 pass through the light incident portion 120, and emit from the light emitting surface 122 so as to illuminate the liquid crystal panel. Thereby, the liquid crystal panel is able to display images.

In order to prevent light beam leakage, the light incident portion 120 with a thickness greater than the main body 123 is formed. The light incident portion 120 takes up extra space, and limits the compactness of the backlight module 100 and the LCD correspondingly. Moreover, in manufacturing the LGP 12, the light incident portion 120 requires extra material. Thus the cost of the backlight module 100, as well as the LCD, is correspondingly high.

It is, therefore, desired to provide a backlight module having a point light source which can overcome the above-described deficiencies.

SUMMARY

In a first aspect, a point light source includes a light emitting body, and a light guide portion adjacent the light emitting body. The light emitting body includes an illuminating portion configured for providing light beams, and a shell packaging the illuminating portion. The light guide portion is configured for guiding the light beams to propagate in desired directions. A size of a cross-section of the light guide portion far away from the light emitting body is less than a size of a cross-section of the light guide portion adjacent to the light emitting body. A backlight module using the point light source is also provided.

In a second aspect, includes a light guide plate and at least one point light source. The light guide plate has substantially uniform thickness, and includes a light incident surface at a side edge thereof. The at least one point light source includes a light emitting body and a light guide portion. The light guide portion and the light emitting body define an interface therebetween. The light guide portion includes an end surface farthest from the interface and adjacent to the light incident surface. A height of the end surface is less than a corresponding height of the interface.

In a third aspect, a backlight module includes a light guide plate and at least one point light source. The light guide plate has substantially uniform thickness, and includes a light incident surface having a height substantially the same as said uniform thickness. The at least one point light source includes a light emitting body and a light guide portion. The light guide portion has a generally wedged-shaped or pyramidal frustum structure. A thin end of the light guide portion is adjacent to the light incident surface of the light guide plate, and a thick end of the light guide portion is adjacent to the light emitting body.

Other novel features and advantages will become more apparent from the following detailed description when taken in conjunction with the accompanying drawings. In the drawings, all the views are schematic.

DETAILED DESCRIPTION OF PREFERRED EMBODIMENTS

Reference will now be made to the drawings to describe preferred and exemplary embodiments of the present invention in detail.

Figure 1:
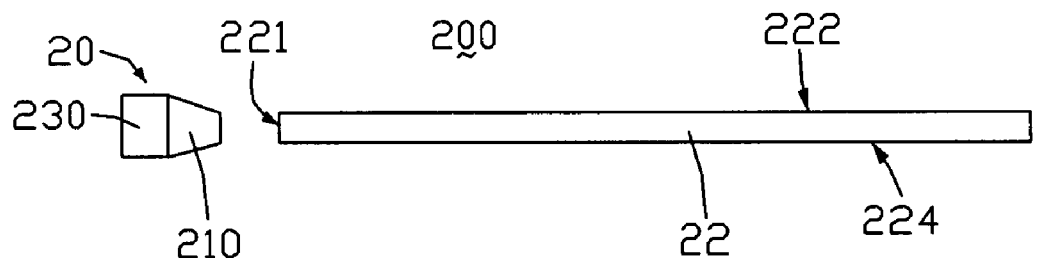
FIG. 1 is a side plan view of a backlight module according to a first embodiment of the present invention, the backlight module including a point light source.

FIG. 1 is a side plan view of a backlight module according to a first embodiment of the present invention. The backlight module 200 includes a light guide plate 22 and a point light source 20. The light guide plate 22 has a flat plate structure, and includes a top light emitting surface 222, a bottom surface 224, and a light incident surface 221 adjoining both the light emitting surface 222 and the bottom surface 224.

The point light source 20 is typically a light emitting diode (LED), and includes a light emitting body 230 and a light guide portion 210. The light guide portion 210 is disposed adjacent to the light incident surface 221 of the light guide plate 22.

Figure 2:
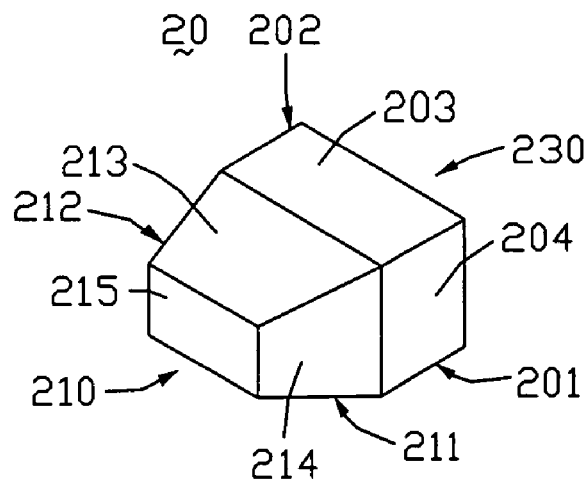
FIG. 2 is an enlarged, isometric view of the point light source of the backlight module of FIG. 1.

Referring also to FIG. 2, an enlarged, isometric view of the point light source 20 is shown. The light emitting body 230 of the point light source 20 includes a plastic shell (not labeled), and an illuminating portion (not visible) packaged by the plastic shell. The plastic shell and the light guide portion 210 are formed integrally as a one-piece structure. That is, the light guide portion 210 is made of transparent plastic. In one embodiment, the light guide portion 210 is a solid mass of the transparent plastic, and the light guide portion 210 and the plastic shell of the light emitting body 230 are manufactured via molding so as to form as the one-piece structure. The plastic shell includes a first sidewall 201, a second sidewall 202 perpendicular to the first sidewall 201, a third sidewall 203 parallel to the first sidewall 201, and a fourth sidewall 204 parallel to the second sidewall 202. The first sidewall 201, the second sidewall 202, the third sidewall 203, and the fourth sidewall 204 are arranged end-to-end and cooperatively form a cuboidal accommodating structure for receiving the illuminating portion. The illuminating portion includes a conventional semiconductor chip having a positive negative (PN) junction.

The light guide portion 210 has a pyramidal frustum structure, and includes a first side surface 211, a second side surface 212, a third side surface 213, a fourth side surface 214, and an emission surface 215. The emission surface 215 is in the shape of rectangle. The first side surface 211, the second side surface 212, the third side surface 213, and the fourth side surface 214 are each in the shape of an isosceles trapezoid, and are arranged end-to-end. The first side surface 211, the second side surface 212, the third side surface 213, and the fourth side surface 214 respectively extend from the first sidewall 201, the second sidewall 202, the third sidewall 203, and the fourth sidewall 204. The light guide portion 210 gradually tapers with increasing distance away from the light emitting body 230. Thus, a size of a cross-section of the light guide portion 210 far away from the light emitting body 230 is less than a size of a cross-section of the light guide portion 210 adjacent to the light emitting body 230.

A rectangular border where the side surfaces 211, 212, 213, 214 adjoin the sidewalls 201, 202, 203, 204 defines a planar interface (not visible) where the light guide portion 210 adjoins the light emitting body 230. The illuminating portion inside the light emitting body 230 faces toward the interface. The interface is parallel to the emission surface 215. A border where the first side surface 211 adjoins the emission surface 215 is defined as one long border of the emission surface 215. A border where the third side surface 213 adjoins the emission surface 215 is defined as another long border of the emission surface 215. A border where the second side surface 212 adjoins the emission surface 215 is defined as one short border of the emission surface 215. A border where the fourth side surface 214 adjoins the emission surface 215 is defined as another short border of the emission surface 215.

A height of the interface is measured from the first sidewall 201 to the third sidewall 203. A height of the emission surface 215 is measured by a length of either of the short borders. The height of the emission surface 215 is less than that of the interface. The height of the emission surface 215 is the same as a thickness of the light guide plate 22, which thickness is measured from the light emitting surface 221 to the bottom surface 224.

In assembly, the emission surface 215 of the light guide portion 210 is positioned to fully abut the light incident surface 221 of the light guide plate 22. Thereby, one long border of the emission surface 215 is adjacent to a top edge of the light incident surface 221, and the other long border of the emission surface 215 is adjacent to a bottom edge of the light incident surface 221. Optical films (not shown), such as a diffuser sheet and a brightness enhancement film, are disposed on the light emitting surface 222. When the backlight module 200 is employed in an LCD, a liquid crystal panel (not shown) is provided and disposed on the optical films. In operation, light beams provided by the illuminating portion are emitted out from the emission surface 215 of the light guide portion 210, enter the light guide plate 22 via the light incident surface 221, and then emit from the light emitting surface 222 so as to illuminate the liquid crystal panel. Thereby, the liquid crystal panel is able to display images. Thus, due to the light guide portion 210, substantially all the light beams emitted by the illuminating portion propagate in desired directions and enter the light incident surface 221 of the light guide plate 22.

In summary, the light guide portion 210 is in the shape of a pyramidal frustum, with a cross-section of the light guide portion 210 far away from the light emitting body 230 being smaller than a cross-section of the light guide portion 210 adjacent to the light emitting body 230. Thereby, the height of the emission surface 215 can be configured to be the same as the thickness of the light guide plate 22. As a result, the point light source 20 is able of fully abut the light incident surface 221 of the light guide plate 22, with no need for the light guide plate 22 to have a thickened portion at the end thereof where the light incident surface 221 is located. That is, the backlight module 200 is capable of preventing light beam leakage without the need for the light guide plate 22 to have a thickened portion. Thus when the backlight module 200 is employed in an LCD, extra space that might otherwise be taken up by a thickened portion of the light guide plate 22 is saved, and the compactness of the LCD can be improved. Moreover, extra material that might otherwise be used in manufacturing a thickened portion of the light guide plate 22 is saved. Therefore the cost of manufacturing the light guide plate 22, as well as the backlight module 200, can be reduced accordingly.

Figure 3:
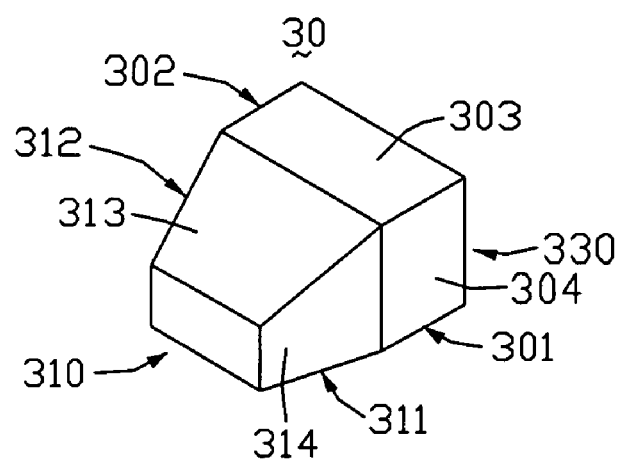
FIG. 3 is an isometric view of a point light source of a backlight module according to a second embodiment of the present invention.

FIG. 3 is an isometric view of a point light source 30 of a backlight module according to a second embodiment of the present invention. The point light source 30 is similar to the point light source 20. However, the point light source 30 includes a light emitting body 330 and a light guide portion 310. The light emitting body 330 includes a first sidewall 301, a second sidewall 302 perpendicular to the first sidewall 301, a third sidewall 303 parallel to the first sidewall 301, and a fourth sidewall 304 parallel to the second sidewall 302. The light guide portion 310 includes a first side surface 311, a second side surface 312, a third side surface 313, and a fourth side surface 314. The first side surface 311, the second side surface 312, the third side surface 313, and the fourth side surface 314 respectively extend from the first sidewall 301, the second sidewall 302, the third sidewall 303, and the fourth sidewall 304.

The first side surface 311 and the third side surface 313 are each in the shape of an isosceles trapezoid. The second side surface 312 and the fourth side surface 314 are each in the shape of a right-angled trapezoid. Thus, the first side surface 311 is coplanar with the first sidewall 301.

Figure 4:
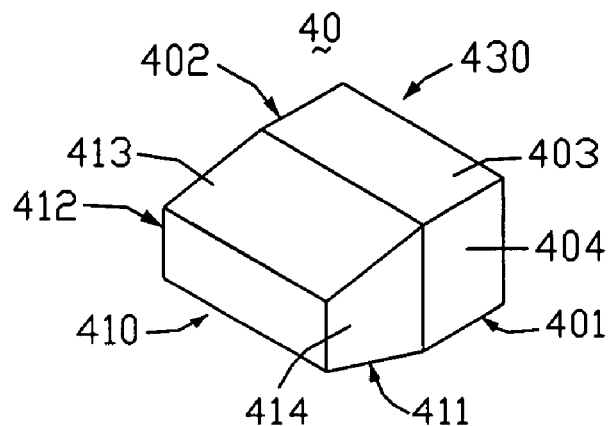
FIG. 4 is an isometric view of a point light source of a backlight module according to a third embodiment of the present invention.

FIG. 4 is an isometric view of a point light source 40 of a backlight module according to a third embodiment of the present invention. The point light source 40 is similar to the point light source 20. However, the point light source 40 includes a light emitting body 430 and a light guide portion 410. The light emitting body 430 includes a first sidewall 401, a second sidewall 402 perpendicular to the first sidewall 401, a third sidewall 403 parallel to the first sidewall 401, and a fourth sidewall 404 parallel to the second sidewall 402. The light guide portion 410 includes a first side surface 411, a second side surface 412, a third side surface 413, and a fourth side surface 414. The first side surface 411, the second side surface 412, the third side surface 413, and the fourth side surface 414 respectively extend from the first sidewall 401, the second sidewall 402, the third sidewall 403, and the fourth sidewall 404.

The first side surface 411 and the third side surface 413 are each in the shape of a rectangle. The second side surface 412 and the fourth side surface 414 are each in the shape of an isosceles trapezoid. Thus, the second side surface 412 is coplanar with the second sidewall 402, and the fourth side surface 414 is coplanar with the fourth sidewall 404.

Figure 5:
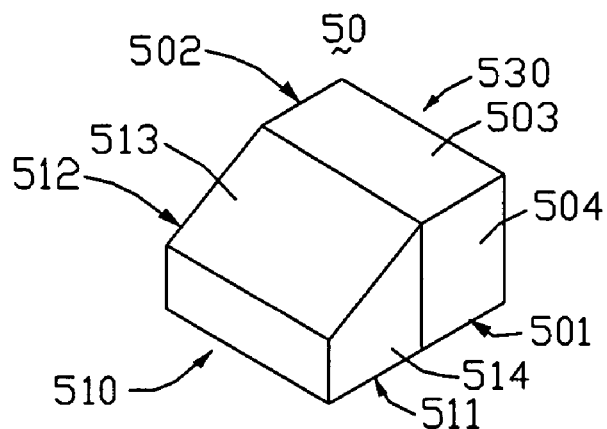
FIG. 5 is an isometric view of a point light source of a backlight module according to a fourth embodiment of the present invention.
Figure 6:
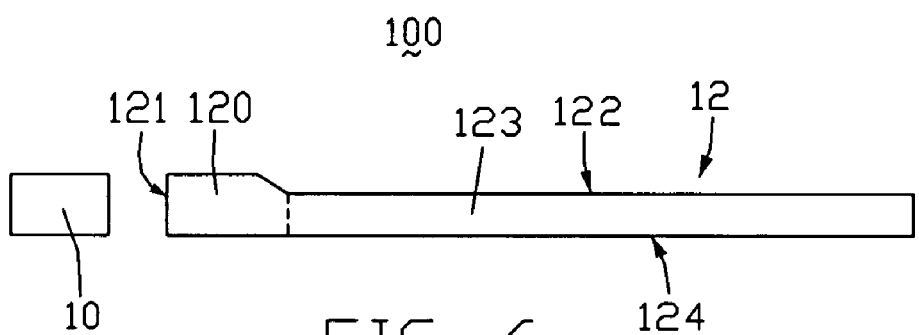
FIG. 6 is a side plan view of a conventional backlight module.

FIG. 5 is an isometric view of a point light source 50 of a backlight module according to a fourth embodiment of the present invention. The point light source 50 is similar to the point light source 20. However, the point light source 50 includes a light emitting body 530 and a light guide portion 510. The light emitting body 530 includes a first sidewall 501, a second sidewall 502 perpendicular to the first sidewall 501, a third sidewall 503 parallel to the first sidewall 501, and a fourth sidewall 504 parallel to the second sidewall 502. The light guide portion 510 includes a first side surface 511, a second side surface 512, a third side surface 513, and a fourth side surface 514. The first side surface 511, the second side surface 512, the third side surface 513, and the fourth side surface 514 respectively extend from the first sidewall 501, the second sidewall 502, the third sidewall 503, and the fourth sidewall 504.

The first side surface 511 and the third side surface 513 are each in the shape of a rectangle. The second side surface 512 and the fourth side surface 514 are each in the shape of a right-angled trapezoid. The first side surface 511 is coplanar with the first sidewall 501. The second side surface 512 is coplanar with the second sidewall 502. The fourth side surface 514 is coplanar with the fourth sidewall 504.

In alternative embodiments, the side surfaces of the light emitting portions 210, 310, 410, 510 can be in other shapes, as long as each light emitting portion 210, 310, 410, 510 has a generally wedge-shaped structure or a pyramidal frustum structure, and a height of each emission surface of the light emitting portion 210, 310, 410, 510 is not greater than the thickness of the corresponding light guide plate 22. The light emitting portions 210, 310, 410, 510 can be hollow structures, with reflected material disposed on inner surfaces of the light emitting portions 210, 310, 410, 510 in order to improve an efficiency of utilization of light beams. The backlight module 200 can include a plurality of point light sources adjacent to the light incident surface 221, with each point light source being one of the point light sources 20, 30, 40, 50.

It is to be further understood that even though numerous characteristics and advantages of preferred and exemplary embodiments have been set out in the foregoing description, together with details of the structures and functions of the embodiments, the disclosure is illustrative only; and that changes may be made in detail within the principles of the present invention to the full extent indicated by the broad general meaning of the terms in which the appended claims are expressed.

What is claimed is:

1. A backlight module, comprising:
a light guide plate having uniform thickness and a light incident surface having a height substantially the same as said uniform thickness; and
at least one point light source having a light emitting body and a light guide portion configured for guiding light beams into the light guide plate through the light incident surface;
wherein the light guide portion has a generally wedged-shaped or pyramidal frustum structure, a thin end of the light guide portion is configured as a light emission end and faces the light incident surface of the light guide plate, and a thick end opposite to the thin end of the light guide portion is adjacent to the light emitting body, the light guide portion comprises a first side surface, a second side surface, a third side surface, and a fourth side surface, and the first side surface, the second side surface, the third side surface, and the fourth side surface are arranged end-to-end;
the light emitting body comprises an illuminating portion configured for providing the light beams, and a shell packaging the illuminating portion; and
the shell has a cuboidal structure comprising a first sidewall, a second sidewall, a third sidewall, and a fourth sidewall, and the first side surface, the second side surface, the third side surface, and the fourth side surface of the light guide portion respectively extend from the first sidewall, the second sidewall, the third sidewall, and the fourth sidewall.

2. The backlight module as claimed in claim 1, wherein a maximum thickness of the thin end of the light guide portion is the same as the height of the light incident surface of the light guide plate.

3. The backlight module as claimed in claim 1, wherein the light guide portion further comprises an end surface, the end surface of the light guide portion positioned adjacent to the first side surface, the second side surface, the third side surface, and the fourth side surface, wherein the light guide portion guides the light beams provided by the light emitting body to emit from the end surface into the light incident surface of the light guide plate.

4. The backlight module as claimed in claim 1, wherein the first side surface and the third side surface are each in the shape of an isosceles trapezoid.

5. The backlight module as claimed in claim 4, wherein the second side surface and the fourth side surface are each in the shape of an isosceles trapezoid.

6. The backlight module as claimed in claim 4, wherein the second side surface and the fourth side surface are each in the shape of a right-angled trapezoid.

7. The backlight module as claimed in claim 1, wherein the first side surface and the third side surface are each in the shape of a rectangle.

8. The backlight module as claimed in claim 7, wherein the second side surface and the fourth side surface are each in the shape of an isosceles trapezoid.

9. The backlight module as claimed in claim 7, wherein the second side surface and the fourth side surface are each in the shape of a right-angled trapezoid.

10. The backlight module as claimed in claim 1, wherein the first sidewall is coplanar with the first side surface.

11. The backlight module as claimed in claim 1, wherein the second and fourth sidewalls are coplanar with the second and fourth side surfaces, respectively.

12. A backlight module, comprising:
- a light guide plate having uniform thickness and a light incident surface having a height substantially the same as said uniform thickness; and
- at least one point light source having a light emitting body and a light guide portion configured for guiding light beams into the light guide plate through the light incident surface;

wherein the light guide portion has a generally wedged-shaped or pyramidal frustum structure, a thin end of the light guide portion is configured as a light emission end and faces the light incident surface of the light guide plate, and a thick end opposite to the thin end of the light guide portion is adjacent to the light emitting body;

the light emitting body comprises an illuminating portion configured for providing the light beams, and a shell packaging the illuminating portion; and the light guide portion and the shell of the light emitting body are formed integrally as a single piece of material.

* * * * *